United States Patent
Fetzer et al.

(10) Patent No.: US 12,287,272 B2
(45) Date of Patent: Apr. 29, 2025

(54) POROSITY DETECTION FOR COMPOSITE MATERIALS USING INDUCTIVE RESONANCE

(71) Applicant: THE BOEING COMPANY, Chicago, IL (US)

(72) Inventors: Barry Allen Fetzer, Tukwila, WA (US); Samuel Roy Goertz, Tukwila, WA (US)

(73) Assignee: THE BOEING COMPANY, Arlington, VA (US)

( * ) Notice: Subject to any disclaimer, the term of this patent is extended or adjusted under 35 U.S.C. 154(b) by 311 days.

(21) Appl. No.: 18/053,807

(22) Filed: Nov. 9, 2022

(65) Prior Publication Data

US 2024/0151627 A1    May 9, 2024

(51) Int. Cl.
*G01N 15/08* (2006.01)
*B64F 5/60* (2017.01)

(52) U.S. Cl.
CPC ........... *G01N 15/0806* (2013.01); *B64F 5/60* (2017.01)

(58) Field of Classification Search
CPC .... G01N 15/00; G01N 15/08; G01N 15/0806; B64F 5/60
See application file for complete search history.

(56) References Cited

U.S. PATENT DOCUMENTS

2010/0264914 A1    10/2010    Minh
2023/0109919 A1*    4/2023    McGushion ......... G01N 29/043
                                                    324/236

FOREIGN PATENT DOCUMENTS

| FR | 2390729 A1 | 12/1978 | |
| JP | H09113488 A | 5/1997 | |
| JP | 2004286658 A * | 10/2004 | ............. G01N 27/90 |
| JP | 2004309333 A * | 11/2004 | ............. G01N 29/04 |

OTHER PUBLICATIONS

Machine Translation of JP-2004286658-A (Year: 2004).*
Machine Translation of JP-2004309333-A (Year: 2004).*
Extended European Search Report for application No. 23208218.0 dated Mar. 21, 2024, pp. 1-11.
Ma, X. et al., "Eddy Current Measurement of the Electrical Conductivity and Porosity of Metal Foams," IMTC 2004— Instrumentation and Measurement Technology Conference, Como, Italy, May 18-20, 2004, pp. 1-6.

(Continued)

*Primary Examiner* — Nguyen Q. Ha
(74) *Attorney, Agent, or Firm* — Moore IP Law

(57) ABSTRACT

A non-destructive test apparatus includes a drive coil and a resonant coil in working relation to the drive coil. The non-destructive test apparatus includes a voltage source coupled to the drive coil. The voltage source is configured to apply an alternating current signal to the drive coil. The non-destructive test apparatus includes a sensor coupled to the resonant coil. The sensor is configured to output sensor data indicative of a voltage induced in the resonant coil by the alternating current signal applied to the drive coil. The non-destructive test apparatus also includes a processor coupled to the sensor to receive the sensor data from the sensor. The processor is configured to determine, based on the voltage, a porosity of an item positioned in working relation to the resonant coil.

20 Claims, 5 Drawing Sheets

(56) References Cited

OTHER PUBLICATIONS

Mook, Gerhard et al., "Non-destructive characterisation of carbon-fibre-reinforced plastics by means of eddy-currents," Composites Science and Technology vol. 61, 2001, pp. 865-873.

Vityaz, P. A., "Distribution of porosity in sintered permeable materials by an eddy current method," May 1, 1984, pp. 381-384; retrieved: https://link.springer.com/content/pdf/10.1007/BF00796603.pdf, Mar. 13, 2024.

\* cited by examiner

POROSITY DETECTION FOR COMPOSITE MATERIALS USING INDUCTIVE RESONANCE

FIELD OF THE DISCLOSURE

The present disclosure is related to systems and methods for detection of porosity of composite materials using inductive resonance.

BACKGROUND

Composite materials have physical properties (e.g., stiffness and strength-to-weight ratio) that make composite materials attractive for use in many industrial applications including uses in products produced by automotive industries and aviation industries. The physical properties of a composite material are dependent on a porosity of the composite material. Porosity is due to the presence of voids produced during a manufacturing process that displace resin of the composite material. A high porosity composite material has significantly lower values for some properties (e.g., shear strength) as compared to a low porosity composite material of the same composition and thickness. Composite materials to be used in products (e.g., aircraft and automobiles) are tested to ensure that the porosity of the materials is below a particular threshold porosity (e.g., 5%, 2.5%, or some other porosity value).

Tests for porosity of composite material and other materials include destructive tests (e.g., materialography and acid digestion) and nondestructive tests (e.g., ultrasonic attenuation and x-ray computed tomography). For industrial applications, nondestructive tests are preferred. Methods and equipment for porosity testing can be time consuming, can require special environments (e.g., tanks for submersion of at least a portion of a test sample in water or another fluid), can be subject to significant error (e.g., 20% or more for ultrasonic attenuation testing), and can be expensive (e.g., a cost of computed tomography equipment is high). It is desirable to have a nondestructive porosity testing device that is quick, reliable, does not require expensive equipment, and enables air-coupled inspection without a need for a special environment (e.g., an environment to accommodate water submersion)

SUMMARY

According to one implementation of the present disclosure, a non-destructive test apparatus includes a drive coil and a resonant coil in working relation to the drive coil. The non-destructive test apparatus includes a voltage source coupled to the drive coil. The voltage source is configured to apply an alternating current signal to the drive coil. The non-destructive test apparatus includes a sensor coupled to the resonant coil. The sensor is configured to output sensor data indicative of a voltage induced in the resonant coil by the alternating current signal applied to the drive coil. The non-destructive test apparatus also includes a processor coupled to the sensor to receive the sensor data from the sensor. The processor is configured to determine, based on the voltage, a porosity of an item positioned in working relation to the resonant coil.

According to another implementation of the present disclosure, a method includes receiving, at a porosity detector, input to initiate non-destructive testing of porosity of an item. The item is located in working relation to a resonant coil of the porosity detector. The method includes causing, via the porosity detector based on the input, application of a first alternating current signal to a drive coil of the porosity detector to induce a second alternating current signal in the resonant coil. The method also includes determining a porosity of the item, at a processor of the porosity detector, based on sensor data received from a sensor of the porosity detector. The sensor data includes a voltage of the second alternating current signal. The voltage is proportional to the porosity of the item.

According to another implementation of the present disclosure, a method includes sending, to a drive coil of a porosity detector from a voltage source, a first alternating current signal to induce a second alternating current signal in a resonant coil of the porosity detector disposed in working relation to the drive coil and in working relation to an item under test. The method includes determining, via a sensor of the porosity detector, a voltage of the second alternating current signal. The method also includes providing, from the porosity detector, an alert to one or more devices in response to a determination that the voltage is at or above a threshold value. The alert indicates that a porosity of the item is above a threshold porosity.

The features, functions, and advantages that have been described can be achieved independently in various implementations or may be combined in yet other implementations, further details of which are disclosed with reference to the following description and drawings. The drawings are conceptual and not drawn to scale.

DETAILED DESCRIPTION

Figure 1:
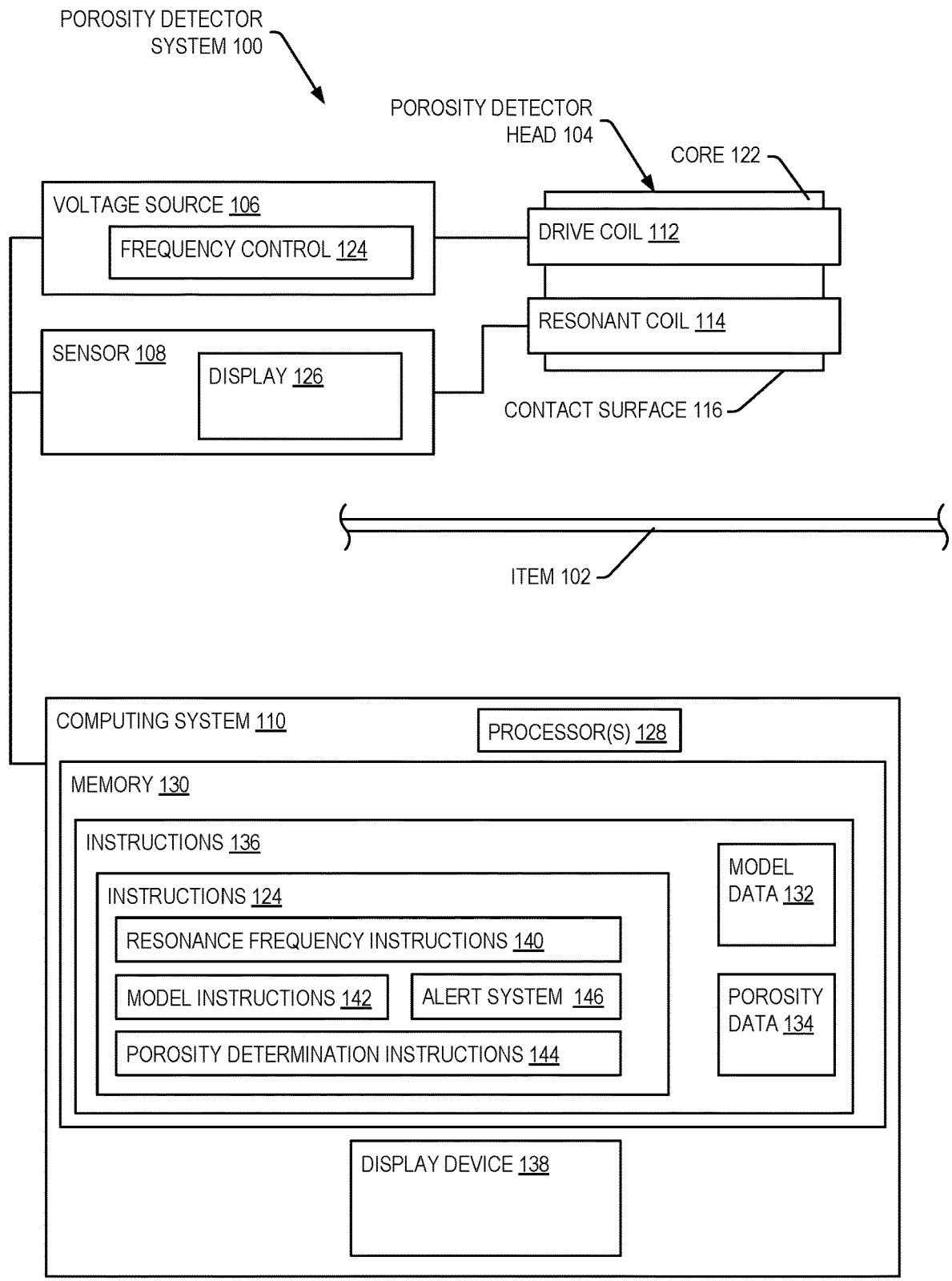
FIG. 1 is a block diagram of a porosity detector system.

A porosity detector system utilizes a high Q factor radio frequency resonator to determine porosity of a material. The resonator of the porosity detector system includes a drive coil and a resonant coil that are stacked together. A voltage source provides an input alternating current signal corresponding to a first voltage potential across the drive coil. The input alternating current signal induces an induced alternating current signal corresponding to a second voltage potential across the resonant coil. In some implementations, the input alternating current has a frequency at or near a natural resonance frequency of the resonator. When the resonant coil is in contact with the material, the second voltage potential across the resonant coil is varied as a result of the porosity level in the material while the potential across the drive coil remains the same. As a result, the induced alternating current signal also varies. A sensor coupled to the resonant coil receives the induced alternating current signal when the resonant coil is coupled to the material and calculates the second voltage potential. A computing device determines the porosity of the material from the second voltage potential based on an equation for the porosity of the material determined from experimental voltage data taken for samples of the same material but having known porosity. The porosity detector system provides a quick, reliable, and non-destructive way to determine porosity of a particular type of item, such as a sheet of composite material, without a need for a special environment (e.g., tanks for submersion of the item in a fluid), and without a need for expensive equipment such as computed tomography equipment.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or arrangement of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram of a porosity detector system 100 for determining porosity of an item 102. The porosity detector system 100 is a non-destructive test apparatus that enables determination of porosity of the item 102. In some implementations, the item 102 is made of a composite material such as a laminated carbon fiber composite. In other implementations, the item 102 is another type of material (e.g., wood, wood product, polymer, or combinations thereof) where porosity of the material is of concern. In particular implementations, the item 102 is a sheet of material of a particular thickness.

The porosity detector system 100 includes a porosity detector head 104, a voltage source 106, a sensor 108, and a computing device 110. In some implementations, the voltage source 106, the sensor 108, the computing device 110, or combinations thereof, are located in a housing or in a rack system. In some implementations, the porosity detector head 104 is fixed in position relative to one or more of the voltage source 106, the sensor 108, the computing device 110, and an operator of the porosity detector system 100 causes the item 102 to move relative to the porosity detector head 104 to one or more test locations of the item during use of the porosity detector system 100. In other implementations, the porosity detector head 104 is movable relative to one or more of the item 102, the voltage source 106, the sensor 108, and the computing device 110, and an operator of the porosity detector system 100 moves the porosity detector head 104 to one or more test locations of the item 102 during use of the porosity detector system 100.

The porosity detector head 104 includes a drive coil 112 and a resonant coil 114. A contact surface 116 of the porosity detector head 104 is placed on the item 102 at a test location during use of the porosity detector system 100 to determine porosity of the item 102. The contact surface 116 has a shape that corresponds to a shape of a surface of the item 102 under test (e.g., the contact surface 116 and the surface of the item 102 are flat surfaces or the contact surface 116 and the surface of the item 102 are complementary curved surfaces such that an axial center line of the drive coil 112 and the resonant coil is normal to the surface of the item 102). During use of the porosity detector system 100, the porosity detector head 104 is sequentially positioned at multiple test locations to detect variance of the porosity of the item 102 in different regions of the item 102 and to determine that the porosity of the item 102 does not exceed a threshold porosity in one or more of the regions. In some implementations, the porosity detector head 104 includes a housing that retains the drive coil 112 and the resonant coil 114. In such implementations, the contact surface 116 is a portion of the housing.

In some implementations, movement of the porosity detector head 104 relative to the item 102 is performed by an operator of the porosity detector system 100. In other embodiments a mechanical movement system (e.g., a robotic system) moves the porosity detector head 104, the item 102, or both, during use of the porosity detector system 100.

The drive coil 112 and the resonant coil 114 form a coil system that has a high Q factor for RF resonators (e.g., from 50 to 150). The coil system has a resonance frequency near or in a radio frequency range (e.g., from 20 kHz to 300 MHz).

The drive coil 112 is electrically coupled to the voltage source 106 and to ground. The sensor 108 is electrically coupled to the sensor 108 and to ground. The sensor 108 measures a voltage across the resonant coil 114 of a second alternating current signal generated in the resonant coil 114 by application of the first alternating current signal to the drive coil 112. When the contact surface of the porosity detector head 104 is positioned on the item 102, the voltage corresponds to resonance attenuation due to porosity of the item 102.

In some implementations, characteristics (e.g., wind direction, number of turns, length of the coil, diameter of the coil, etc.) of the drive coil 112 and characteristics of the resonant coil 114 are substantially the same. In other implementations, one or more characteristics of the drive coil 112 are different than corresponding characteristics of the resonant coil 114. For example, in a particular implementation, the number of turns of the drive coil 112 is 30 and the number of turns of the resonant coil is also 30. In other implementations, the drive coil 112, the resonant coil 114, or both, have fewer turns or more turns. As another example, in a first implementation, the wind direction of the drive coil 112 is the same as the wind direction of the resonant coil 114, while in a second implementation, the wind direction of the drive coil 112 is in an opposite direction to the wind direction of the resonant coil 114 (e.g., the wind direction of the drive coil 112 is clockwise and the wind direction of the resonant coil 114 is counterclockwise).

In some implementations, the drive coil 112 and the resonant coil 114 are wound around a core 122. In some implementations, the contact surface 116 is a first surface of the core 122 that is positioned on the item 102. The resonant coil 114 is located between the contact surface 116 and the drive coil 112.

In other implementations, the porosity detector head 104 does not include the core 122 and the drive coil 112 is positioned on the resonant coil 114 or is separated from the resonant coil by a spacer ring. In some implementations, the contact surface 116 is an end surface of the resonant coil 114.

The voltage source 106 provides the first alternating current signal to the drive coil 112. The voltage source 106 includes a frequency control 124. The frequency control 124 allows for operator adjustment, computer controlled adjustment, or both, of the frequency of the first alternating current signal to enable determination of a resonance frequency of the coil system. A determined resonance frequency is at or near (e.g., within 5%, 1%, 0.5% or some other value) of the resonance frequency of the coil system. In some implementations, the resonance frequency of the coil system is determined in air from output of the sensor 108 when nothing is near the contact surface 116 of the porosity detector head 104 (e.g., no object is within 5 cm, 10 cm, 20 cm, or some other distance from the contact surface 116), which can be viewed as a condition of 100% porosity. In some implementations, the resonance frequency of the coil system is determined from output of the sensor 108 when the contact surface 116 of the porosity detector head 104 is positioned on a coupon of the same material and thickness as the item 102 to be tested. The porosity of the coupon has a known porosity. In an implementation, the known porosity of the coupon is 0%. In other implementations, the known porosity of the coupon is a non-zero value (e.g., 4.5% or some other value). The determined resonance frequency is provided to the computing device 110.

The sensor 108 receives the second alternating current signal from the resonant coil 114 and determines a voltage of the second alternating current signal. In some implementations, the sensor 108 is an oscilloscope. In some implementations, the sensor 108 includes a display 126. In such implementations, the display 126 displays a graphic representation of the second alternating current signal. The graphic representation facilitates an operator finding the determined resonance frequency of the coil system by adjustment of the frequency of the first alternating current signal using the frequency control 124 of the voltage source 106.

In some implementations, the sensor 108 is a voltmeter. During setup of the porosity detector system 100, at selected time intervals (1 week, 1 month, or other time interval), or both, an oscilloscope is utilized in conjunction with the porosity detector system 100 to find the determined resonance frequency of the coil system.

During use of the porosity detector system 100 to detect porosity of the item 102, the contact surface 116 of the porosity detector head 104 is positioned on a test location of the item 102, the determined resonance frequency of the coil system is applied to the drive coil 112 from the voltage source 106, and the sensor 108 receives the second alternating current signal from the resonant coil 114. The testing location is a location of the item 102 away from edges of the item 102 and without an object near (e.g., within 1 cm, 2 cm, 5 cm, or some other distance), or in contact with, a side of the item 102 opposite to the side of the item 102 that the contact surface 116 of the porosity detector head 104 contacts.

Figure 2:
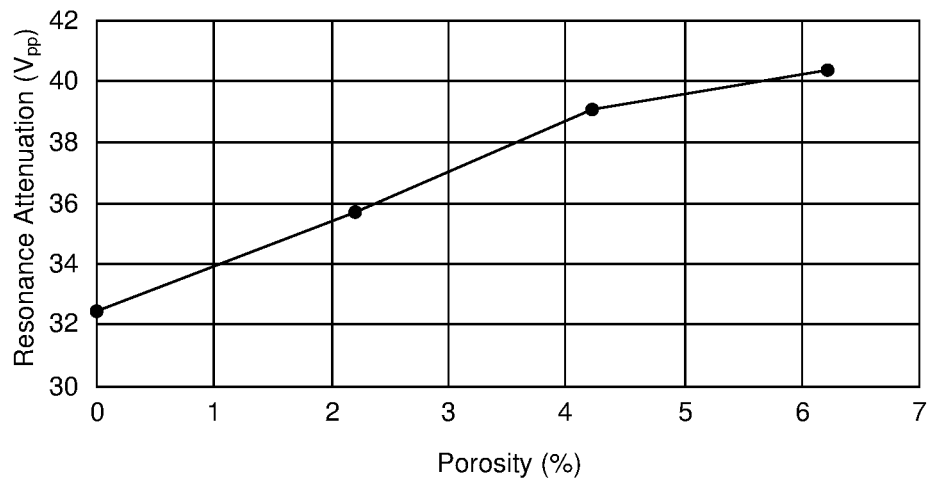
FIG. 2 is a porosity curve for a particular material having 32 plies that depicts a resonance attenuation voltage versus porosity.
Figure 3:
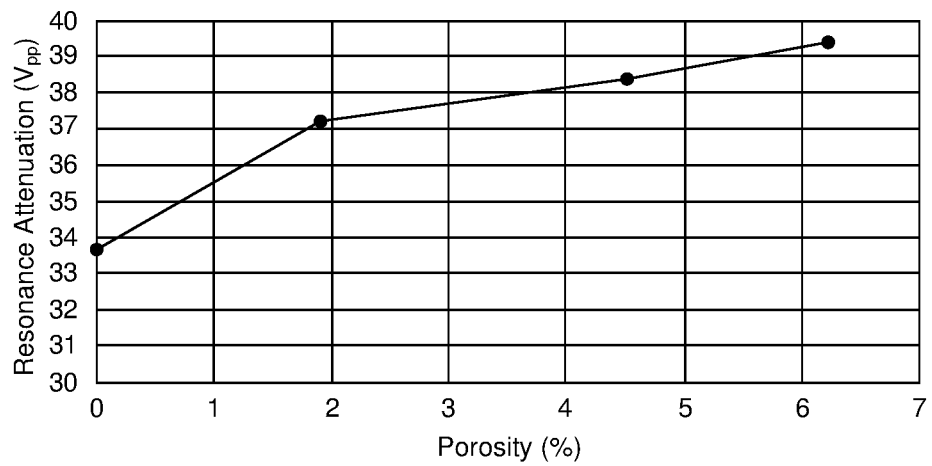
FIG. 3 is a porosity curve for a particular material having 48 plies that depicts a resonance attenuation voltage versus porosity.

The sensor 108 outputs the voltage of the second alternating current signal as a component of sensor data. The sensor data also includes other information such as a time of the test, the test location relative to a reference point of the item 102, etc. The voltage of the second alternating current signal is proportional to the porosity of the item 102. As shown in FIG. 2 and FIG. 3, a high voltage indicates a high porosity and a low voltage indicates a low porosity. FIG. 2 depicts a porosity curve 200 for a 32 ply sheet of a particular carbon fiber composite material (e.g., Material A) and FIG. 3 depicts a porosity curve 300 for a 48 ply sheet of the particular carbon fiber composite material. The voltages of the y-axes of FIG. 2 and FIG. 3 are peak-to-peak voltages.

The computing device 110 is coupled to the voltage source 106, the sensor 108, or both. During use of the porosity detector system 100 to determine porosity of the item 102, the computing device 110 receives the sensor data from the sensor 108, determines a porosity of the item 102 based on the sensor data at a plurality of test locations, and saves the porosity data for the item 102. The computing device 110 also is able to initiate an action in response to satisfaction of a threshold associated with the porosity data. The computing device receives the frequency of the first alternating current signal from the voltage source 106, the sensor data from the sensor 108, or both, via wireline connections, via wireless connections, or combinations thereof.

The computing device 110 includes one or more processors 128 and a memory 130. The memory 130 includes model data 132, porosity data 134, and instructions 136. The model data 132 is a table or database that includes identifiers that identify a particular material of materials for which the porosity detector system 100 can determine porosity. The identifiers include a unique identifier associated with the item 102 under test, a composition identifier of the material, a number of plies that make up the material, a thickness of the material, an identifier of intended application of the material, threshold porosity for the intended application, other properties, or combinations thereof. The threshold porosity for the intended application is a porosity value above which the item 102 is not suitable for use for the intended application. For each material for which the porosity detector system 100 can determine porosity, the model data 132 includes one or more parameters of an equation used to calculate a porosity value based on sensor data received from the sensor 108. In some implementations, the parameters include parameter values for one or more lines or other types of curves that fit experimental data for voltage and known porosity values.

The porosity data 134 includes porosity values for an item 102 under test determined by the computing device 110 using the model data 132. The porosity data 134 can be saved for a period of time after which the porosity data 134 is automatically deleted or allowed to be overwritten, can be manually deleted, can be transferred to another device, can be represented in a particular form (e.g., as tabulated data or as a graph) and printed or sent to a display device, or combinations thereof.

The instructions 136 include instructions executable by the one or more processors 128 to perform operations. In some implementations, the instructions 136 are organized in units (e.g., programs and subprograms) that perform particular tasks and operations. For the implementation depicted in FIG. 1, the units include resonance frequency instructions 140, model instructions 142, porosity determination instructions 144, and an alert system 146.

Execution of the resonance frequency instructions 140 by the one or more processors 128 causes the display device 138 to display operator instructions to setup the porosity detector system 100 and to find the determined resonance frequency of the coil system of the porosity detector head 104 using the voltage source 106, the sensor 108, an oscilloscope, or combinations thereof. The resonance frequency instructions 140 are executable by the one or more processors 128 based on operator input, at startup of the porosity detector system 100, after particular intervals of use of the porosity detector system 100, or combinations thereof.

Execution of the model instructions 142 by the one or more processors 128 causes the display device 138 to display a request for information input identifying the material for which equation parameters are to be determined. The display device 138 also displays steps performable by an operator during a procedure to determine the parameters of an equation used to determine porosity via the porosity detector system 100. The steps include gathering voltage data from the sensor 108 for different samples of the material having known porosities and providing values of the known porosities to the computing device 110 via an input device. When the voltage data is gathered, particular instructions of the model instructions 142 analyze the voltage data to determine the parameters and save data for the material in the model data 132.

Execution of the porosity determination instructions 144 by the one or more processors 128 causes the display device 138 to display a request for input identifying the item 102 to be tested (e.g., a unique identifier of the item 102, the material, the thickness, the number of plies, or combinations thereof), causes testing of the item 102 at one or more test locations using the voltage source 106, the porosity detector head 104, and the sensor 108, and causes generation of the porosity data 134 based on sensor data received from the sensor 108. During execution of the porosity determination instructions 144 by the one or more processors 128, the display device 138 displays steps to be performed by an operator, displays requests for information, alerts from the alert system 146, or combinations thereof. Execution of the porosity determination instructions 144 is initiated by operator input.

The alert system 146 monitors use of the porosity detector system 100 and stops usage of the porosity detector system 100; provides alerts via the display device 138, auditory output systems, or other output devices; or combinations thereof, based on one or more rules, comparisons of one or more values to thresholds, or combinations thereof. For example, when a porosity of the item 102 under test at one or more test locations is determined to be greater than a threshold porosity value of the material retrieved from the model data 132, the alert system 146 generates an alert that the item 102 under test is unusable, and associates an identifier with the unique identifier of the item 102 under test that causes subsequent evaluation of the item 102 under test to determine if one or more portions of the item 102 under test are salvageable or if the item 102 under test is to be scrapped. As another example, if the porosity detector system 100 receives sensor data that includes an unreasonable voltage value for an item 102 under test at a test location (e.g., a voltage of 11.5 V when the 0% porosity voltage for the material is 32.2), the alert system 146 causes the porosity detector head 104 to be removed from the test location, returned to the test location, and second sensor data is determined at the test location. If the second sensor data also indicates an unreasonable voltage value for the item, the alert system 146 stops the testing of the item 102, indicates a fault condition is associated with the porosity detector system 100, and initiates a diagnostic program to determine a cause and solution to the fault condition.

During use of the porosity detector system 100, the determined resonance frequency for the coil system of the porosity detector head 104 is found using the voltage source 106, frequency control 124, the sensor 108, an oscilloscope, the computing device 110, or combinations thereof. Model data 132 for materials to be tested by the porosity detector system 100 is found using coupons of the materials that have known porosities. To test the porosity of an item 102, an operator enters input to initiate a test of the item 102. The operator identifies the item 102 and properties of the item 102 (e.g., a material composition identifier, a number of plies, a thickness, etc.), places the item in working relation to the porosity detector head 104, and contacts a testing location with the contact surface 116 of the porosity detector head 104. During testing of the item 102, the first alternating current signal is supplied from the voltage source 106 to the drive coil 112 to generate the second alternating current signal in the resonant coil 114, the sensor sends sensor data including the voltage for the second alternating current signal to the computing device 110, and the computing device 110 determines the porosity of the item based on the sensor data. The porosity of the item is determined by the porosity detector system 100 at one or more testing locations using the porosity detector system 100.

In a particular implementation, the porosity detector system 100 is configured to indicate whether the item has a porosity over a threshold porosity without calculating and storing porosity values of the item 102. In the particular implementation, the porosity detector system 100 causes display of a first indicator (e.g., a green light) to the display device 138, another display device, or both, when the voltage of the second alternating current determined by the sensor 108 is below a threshold value, which indicates the porosity of the item 102 is acceptable. The porosity detector system 100 causes an auditory alarm, a display of a second indicator (e.g., a red light) to the display device 138, another display device, or both, when the voltage of the second alternating current is at or above the threshold value, which indicates that the porosity of the item 102 is unacceptable.

Figure 4:
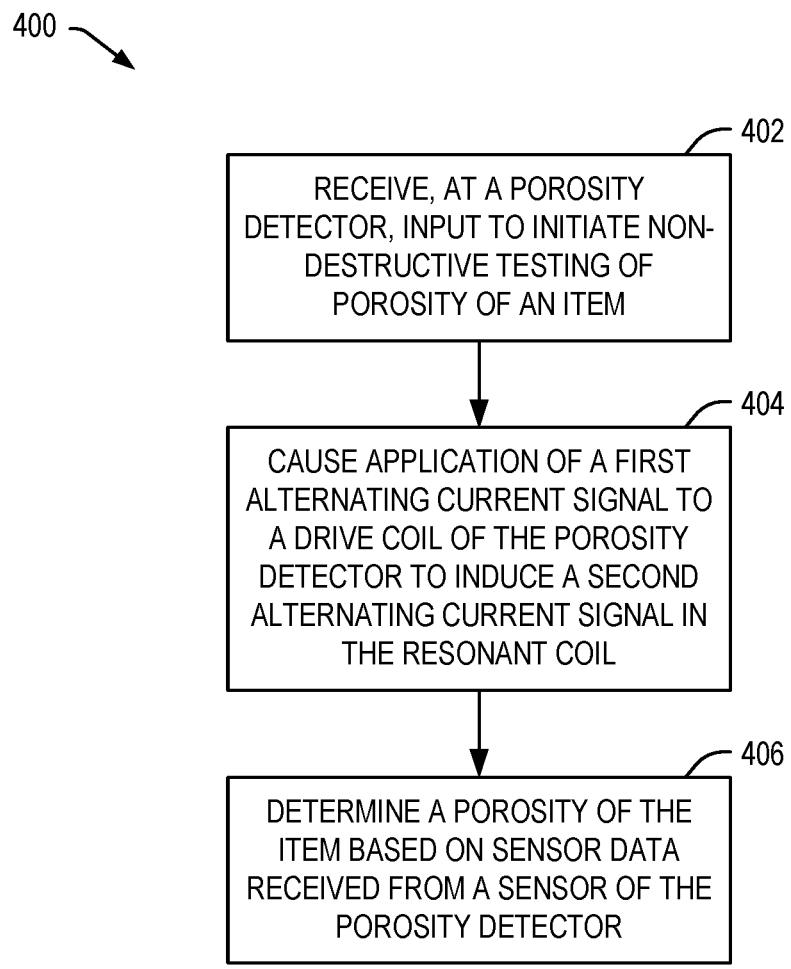
FIG. 4 depicts a flow chart of a method of determining porosity of an item using the porosity detector system of FIG. 1.

FIG. 4 depicts a flow chart of a method 400 of determining porosity of an item using a porosity detector. The method 400 is performed by the porosity detector system 100 of FIG. 1. The method 400, at block 402, includes receiving input to initiate non-destructive testing of porosity of an item. The item is located in working relation to a resonant coil of the porosity detector. In a particular implementation, the input includes an identifier of the item and data identifying the composition and properties of the item. In an implementation, an operator inputs a command to the computing device 110 to test the item 102, and the computing device 110 requests an identifier of the item 102, and presents a listing of available compositions and properties of material that can be tested by the porosity detector system 100. The operator selects an available composition that corresponds to the item 102. The operator places, or causes placement of, the contact surface 116 of the porosity detector head 104 on a test location of the item 102 so that the resonant coil 114 of the porosity detector head 104 is in working relation to the item 102.

The method 400, at block 404, includes causing, based on the input, application of a first alternating current signal to a drive coil of the porosity detector to induce a second alternating current signal in the resonant coil. In an implementation, the operator or the computing device 110 causes the voltage source 106 to apply the first alternating current signal to the drive coil 112 of the porosity detector head 104. The first alternating current signal is at a determined resonant frequency of the coil system of the porosity detector head 104.

The method 400, at block 406, also includes determining the porosity of the item based on sensor data received from a sensor of the porosity detector. The sensor data includes a voltage of the second alternating current signal. The voltage is proportional to the porosity of the item. In an implementation, the computing device 110 receives the sensor data from the sensor 108 and determines the porosity based on the voltage across the resonator coil 114 and based on an equation for the porosity of the material of the item 102. Parameters for the equation are retrieved from the model data 132. The parameters are determined from experimental voltage versus porosity data from a plurality of samples of known porosity of the same material as the item 102 and a same thickness, or number of plies, as the item 102. The experimental voltage versus porosity data is collected using the porosity detector system 100. Based on the input, the porosity detector system 100 determines the porosity of the item 102 at one or more testing locations and saves determined porosities in the porosity data 134.

Figure 5:
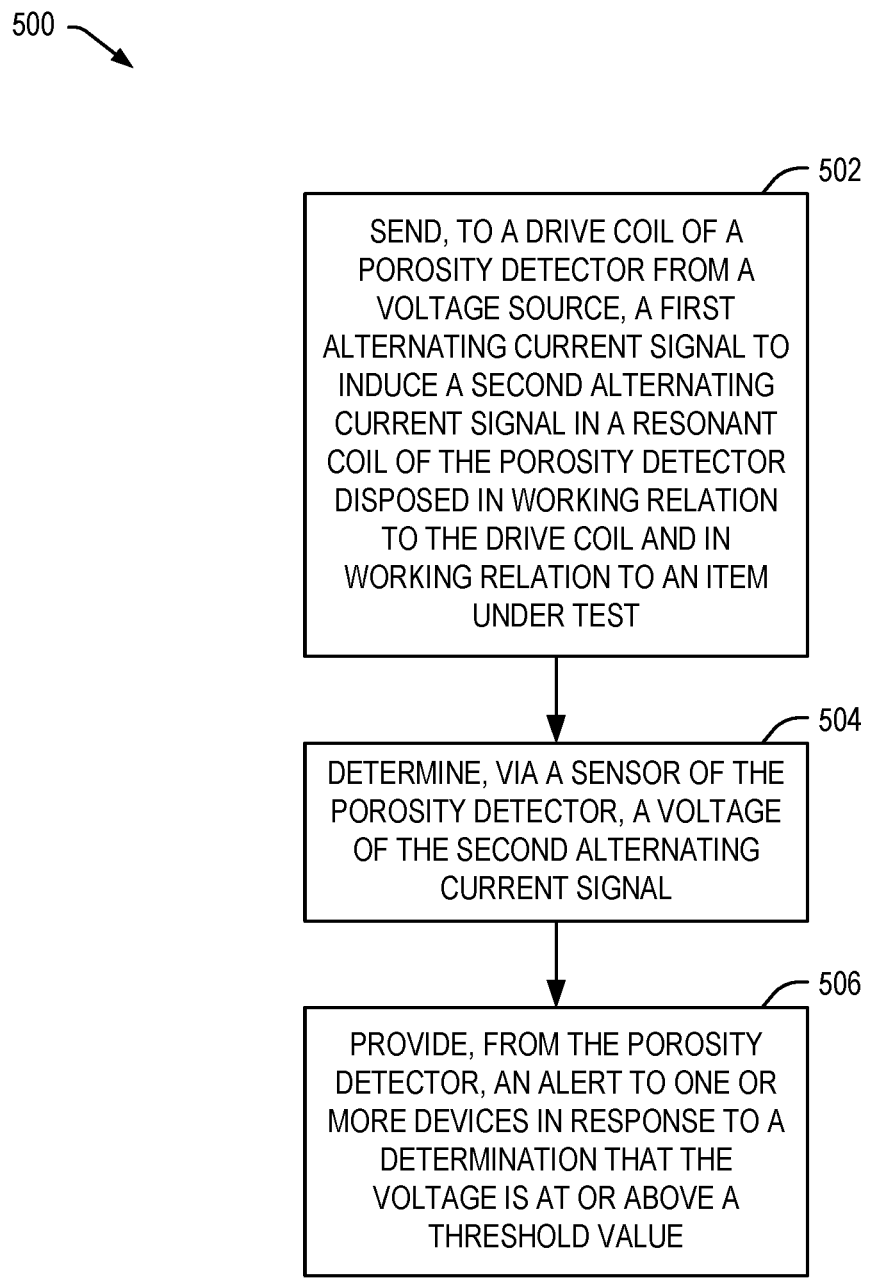
FIG. 5 depicts a flowchart of another method of determining porosity of an item using the porosity detector system of FIG. 1.

FIG. 5 depicts a flow chart of another method 500 of determining porosity of an item using a porosity detector. The method 500 is performed by the porosity detector system 100 of FIG. 1. The method 500, at block 502, includes sending, to a drive coil of a porosity detector from a voltage source, a first alternating current signal to induce a second alternating current signal in a resonant coil of the porosity detector disposed in working relation to the drive coil and in working relation to an item under test. In an implementation, the voltage source 106 of the porosity detector system 100 provides the first alternating current signal to the drive coil 112. The first alternating current signal is at a determined resonance frequency of a coil system of a porosity detector head 104 of the porosity detector system 100.

The method 500, at block 504, includes determining, via a sensor of the porosity detector, a voltage of the second alternating current signal. For example, the sensor 108 determines the voltage of the second alternating current signal generated in the resonant coil 114 by application of the first alternating current signal to the drive coil 112.

The method 500, at block 506, includes providing, from the porosity detector, an alert to one or more devices in response to a determination that the voltage is at or above a threshold value. The alert indicates that a porosity of the item is above a threshold porosity. In an implementation, the alert is a visual signal provided to one or more display devices (e.g., the display device 138), is an audio signal sent to one or more speakers, or both.

Figure 6:
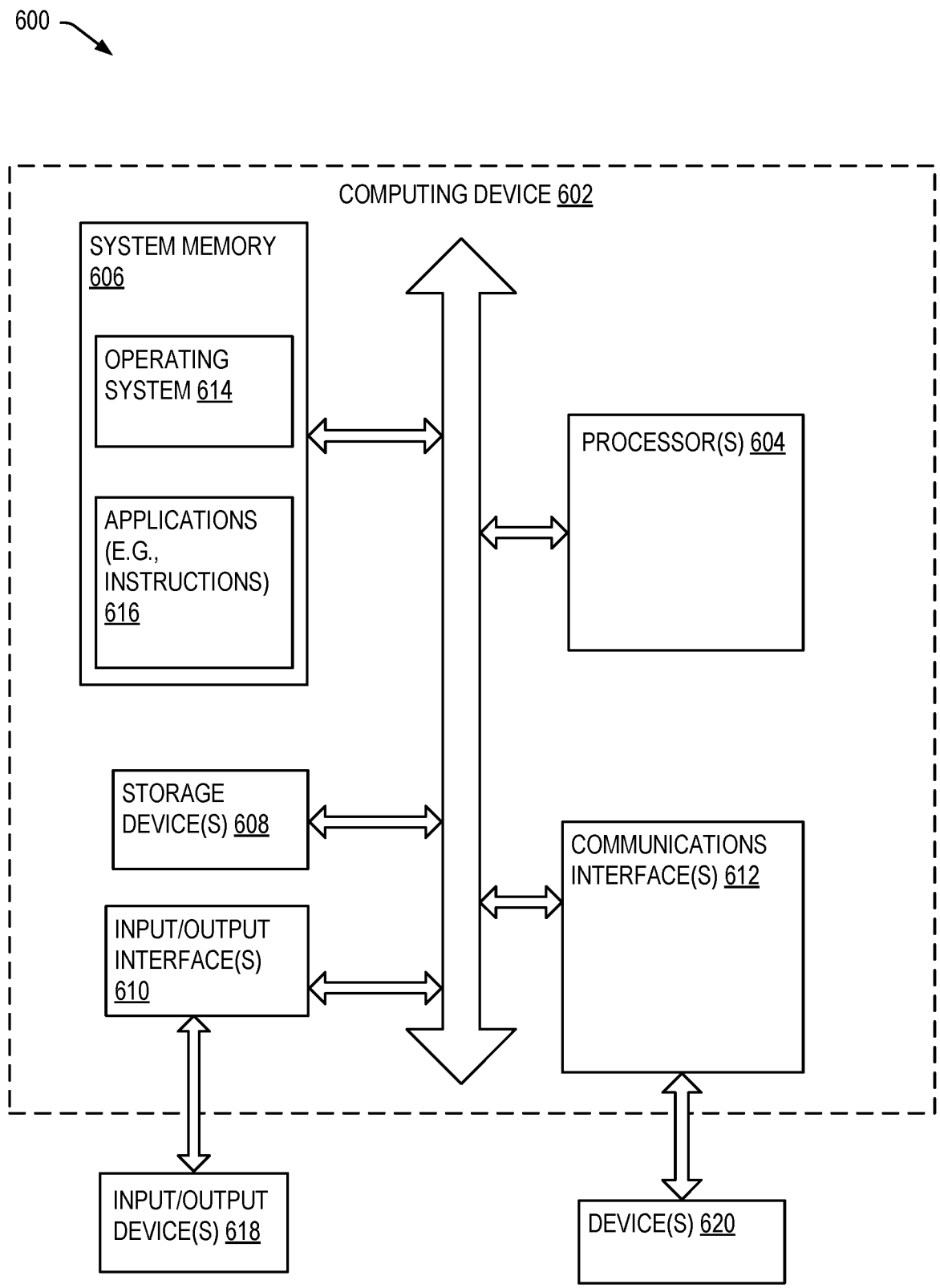
FIG. 6 is a diagram of a representation of a computing device.

FIG. 6 is an illustration of a block diagram of a computing environment 600 including a computing device 602 configured to support implementations of computer-implemented methods and computer-executable program instructions (or code) according to the present disclosure. For example, the computing device 602, or portions thereof, may execute instructions to perform, or cause equipment to perform, operations described with reference to FIGS. 1, 4, and 5. In an implementation, the computing device 602 is, or is a component of, the porosity detector system 100 of FIG. 1, including the voltage source 106, the sensor 108, the computing device 110, or combinations thereof.

The computing device 602 includes one or more processors 604. In an implementation, the processor(s) 604 include the one or more processors 128 of FIG. 1. The processor(s) 604 communicate with a system memory 606, one or more storage devices 608, one or more input/output interfaces 610, one or more communications interfaces 612, or a combination thereof. The system memory 606 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 606 includes an operating system 614, which may include a basic input/output system for booting the computing device 602 as well as a full operating system to enable the computing device 602 to interact with users, other programs, and other devices. The system memory 606 includes one or more applications 616 (e.g., instructions) which are executable by the processor(s) 604. In an implementation, the system memory 606 and the one or more storage devices 608 include the memory 130 of FIG. 1.

The processor(s) 604 communicate with the one or more storage devices 608. For example, the one or more storage devices 608 are non-transitory computer readable media that can include nonvolatile storage devices, such as magnetic disks, optical disks, or flash memory devices. The storage devices 608 can include both removable and non-removable memory devices. The storage devices 608 can be configured to store an operating system, images of operating systems, applications, and program data. In particular implementations, the system memory 606, the storage devices 608, or both, include tangible computer-readable media incorporated in hardware and which are not signals.

The processor(s) 604 communicate with the one or more input/output interfaces 610 that enable the computing device 602 to communicate with one or more input/output devices 618 to facilitate user interaction. The input/output interfaces 610 can include serial interfaces (e.g., universal serial bus (USB) interfaces or Institute of Electrical and Electronics Engineers (IEEE) 1364 interfaces), parallel interfaces, display adapters, audio adapters, and other interfaces. The input/output devices 618 can include keyboards, pointing devices, displays (e.g., one or more monitors, one or more gauges, etc.), speakers, microphones, touch screens, rotatable selectors, levers, knobs, slides, switches, and other devices. The processor(s) 604 detect interaction events based on user input received via the input/output interfaces

610. Additionally, the processor(s) 604 send a display to a display device via the input/output interfaces 610. In some implementations, the input/output devices 618 include the display 126 and the display device 138 of FIG. 1.

The processor(s) 604 can communicate with one or more devices 620 via the one or more communications interfaces 612. The one or more devices 620 can include external computing devices contacted via a communication network and controllers, sensors, and other devices coupled to the computing device 602 via wired or wireless local connections. The one or more communications interfaces 612 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

Aspects of the disclosure are described further with reference to the following set of interrelated clauses:

According to Clause 1, a non-destructive test apparatus includes: a drive coil; a resonant coil in working relation to the drive coil; a voltage source coupled to the drive coil, wherein the voltage source is configured to apply an alternating current signal to the drive coil; a sensor coupled to the resonant coil, wherein the sensor is configured to output sensor data indicative of a voltage induced in the resonant coil by the alternating current signal applied to the drive coil; and a processor coupled to the sensor to receive the sensor data from the sensor, wherein the processor is configured to determine, based on the voltage, a porosity of an item positioned in working relation to the resonant coil.

Clause 2 includes the method of Clause 1, wherein the alternating current signal has a frequency at or near a resonant frequency, in air, of a coil system including the drive coil and the resonant coil.

Clause 3 includes the non-destructive test apparatus of Clause 1, wherein the alternating current signal has a frequency at or near a resonant frequency of a coil system including the drive coil and the resonant coil positioned in working relation to a coupon of a same material as the item that has zero porosity and a thickness of the item.

Clause 4 includes the non-destructive test apparatus of any of Clauses 1 to 3, wherein a coil wind direction of the drive coil is a same direction as a coil wind direction of the resonant coil.

Clause 5 includes the non-destructive test apparatus of any of Clauses 1 to 4, wherein the sensor comprises an oscilloscope.

Clause 6 includes the non-destructive test apparatus of any of Clauses 1 to 5, and further includes a core, wherein the drive coil and the resonant coil are wound about the core, and wherein the core comprises a contact surface configured to be placed in contact with the item.

Clause 7 includes the non-destructive test apparatus of Clause 6, wherein the resonant coil is located between the contact surface and the drive coil.

Clause 8 includes the non-destructive test apparatus of any of Clauses 1 to 8, wherein the item comprises a sheet of composite material.

According to Clause 9, a method includes: receiving, at a porosity detector, input to initiate non-destructive testing of porosity of an item, wherein the item is located in working relation to a resonant coil of the porosity detector; causing, via the porosity detector based on the input, application of a first alternating current signal to a drive coil of the porosity detector to induce a second alternating current signal in the resonant coil; and determining a porosity of the item, at a processor of the porosity detector, based on sensor data received from a sensor of the porosity detector, wherein the sensor data includes a voltage of the second alternating current signal, and wherein the voltage is proportional to the porosity of the item.

Clause 10 includes the method of Clause 9, wherein the porosity detector includes a contact surface configured to be positioned on the item, and wherein the resonant coil is located between the contact surface and the drive coil.

Clause 11 includes the method of Clause 9, wherein a shape of the contact surface corresponds to a shape of a surface of the item.

Clause 12 includes the method of any of Clauses 9 to 11, wherein the first alternating current signal has a frequency at or near a resonant frequency of a coil system including the drive coil and the resonant coil, wherein the resonant frequency is determined in air or on a surface of a 0% porosity sample of a same material and thickness as the item.

Clause 13 includes the method of any of Clauses 9 to 12, wherein the sensor comprises an oscilloscope.

Clause 14 includes the method of any of Clauses 9 to 13, wherein the item comprises a composite material.

Clause 15 includes the method of any of Clauses 9 to 14, wherein the porosity is determined based on experimental voltage versus porosity data from a plurality of samples of the same material of a same thickness as the item with a plurality of different known porosity values.

According to Clause 16, a method includes: sending, to a drive coil of a porosity detector from a voltage source, a first alternating current signal to induce a second alternating current signal in a resonant coil of the porosity detector disposed in working relation to the drive coil and in working relation to an item under test; determining, via a sensor of the porosity detector, a voltage of the second alternating current signal; and providing, from the porosity detector, an alert to one or more devices in response to a determination that the voltage is at or above a threshold value, wherein the alert indicates that a porosity of the item is above a threshold porosity.

Clause 17 includes the method of Clause 16, wherein the first alternating current signal has a frequency at or near a resonant frequency, in air, of a coil system including the drive coil and the resonant coil.

Clause 18 includes the method of Clause 16, wherein the first alternating current signal has a frequency at or near a resonant frequency of a coil system including the drive coil and the resonant coil positioned in working relation to a coupon of a same material as the item having zero porosity and a thickness of the item.

Clause 19 includes the method of any of Clauses 16 to 18, wherein the alert is an auditory signal, a visual signal sent to a display device, or both.

Clause 20 includes the method of any of Clauses 16 to 19, wherein the item comprises a laminated carbon fiber composite material.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A non-destructive test apparatus comprising:
a drive coil;
a resonant coil in working relation to the drive coil;
a core, wherein the drive coil and the resonant coil are wound about the core, and wherein the core comprises a contact surface configured to be placed in contact with an item;
a voltage source coupled to the drive coil, wherein the voltage source is configured to apply an alternating current signal to the drive coil;
a sensor coupled to the resonant coil, wherein the sensor is configured to output sensor data indicative of a voltage induced in the resonant coil by the alternating current signal applied to the drive coil; and
a processor coupled to the sensor to receive the sensor data from the sensor, wherein the processor is configured to determine, based on the voltage, a porosity of the item in response to the item being positioned in working relation to the resonant coil.

2. The non-destructive test apparatus of claim 1, wherein the alternating current signal has a frequency at or near a resonant frequency, in air, of a coil system including the drive coil and the resonant coil.

3. The non-destructive test apparatus of claim 1, wherein the alternating current signal has a frequency at or near a resonant frequency of a coil system including the drive coil and the resonant coil positioned in working relation to a coupon of a same material as the item that has zero porosity and a thickness of the item.

4. The non-destructive test apparatus of claim 1, wherein a coil wind direction of the drive coil is a same direction as a coil wind direction of the resonant coil.

5. The non-destructive test apparatus of claim 1, wherein the sensor comprises an oscilloscope.

6. The non-destructive test apparatus of claim 1, wherein a shape of the contact surface corresponds to a shape of a surface of the item.

7. The non-destructive test apparatus of claim 1, wherein the resonant coil is located between the contact surface and the drive coil.

8. The non-destructive test apparatus of claim 1, wherein the item comprises a sheet of composite material.

9. A method comprising:
receiving, at a porosity detector, input to initiate non-destructive testing of porosity of an item, wherein the item is in contact with a contact surface of a core of the porosity detector;
causing, via the porosity detector based on the input, application of a first alternating current signal to a drive coil of the porosity detector to induce a second alternating current signal in a resonant coil of the porosity detector, wherein the drive coil and the resonant coil are wound about the core; and
determining a porosity of the item, at a processor of the porosity detector, based on sensor data received from a sensor of the porosity detector, wherein the sensor data includes a voltage of the second alternating current signal, and wherein the voltage is proportional to the porosity of the item.

10. The method of claim 9, wherein the resonant coil is stacked between the item and the drive coil.

11. The method of claim 9, wherein a shape of the contact surface corresponds to a shape of a surface of the item.

12. The method of claim 9, wherein the first alternating current signal has a frequency at or near a resonant frequency of a coil system including the drive coil and the resonant coil, wherein the resonant frequency is determined in air or on a surface of a 0% porosity sample of a same material and thickness as the item.

13. The method of claim 9, wherein the sensor comprises an oscilloscope.

14. The method of claim 9, wherein the item comprises a composite material.

15. The method of claim 9, wherein the porosity is determined based on experimental voltage versus porosity data from a plurality of samples of the same material of a same thickness as the item with a plurality of different known porosity values.

16. A method comprising:
sending, to a drive coil of a porosity detector from a voltage source, a first alternating current signal to induce a second alternating current signal in a resonant coil of the porosity detector disposed in working relation to the drive coil and in working relation to an item under test, wherein the resonant coil is stacked between the item and the drive coil;
determining, via a sensor of the porosity detector, a voltage of the second alternating current signal; and
providing, from the porosity detector, an alert to one or more devices in response to a determination that the voltage is at or above a threshold value, wherein the alert indicates that a porosity of the item is above a threshold porosity.

17. The method of claim 16, wherein the first alternating current signal has a frequency at or near a resonant frequency, in air, of a coil system including the drive coil and the resonant coil.

18. The method of claim 16, wherein the first alternating current signal has a frequency at or near a resonant frequency of a coil system including the drive coil and the resonant coil positioned in working relation to a coupon of a same material as the item having zero porosity and a thickness of the item.

19. The method of claim 16, wherein the alert is an auditory signal, a visual signal sent to a display device, or both.

20. The method of claim 16, wherein the item comprises a laminated carbon fiber composite material.

* * * * *